United States Patent
Amsz et al.

(10) Patent No.: US 12,128,750 B2
(45) Date of Patent: Oct. 29, 2024

(54) ENERGY STORE-FLOOR ASSEMBLY FOR A MOTOR VEHICLE

(71) Applicant: Bayerische Motoren Werke Aktiengesellschaft, Munich (DE)

(72) Inventors: Markus Amsz, Bachenhausen (DE); Jan Danneberg, Munich (DE); Andre Heckert, Munich (DE); Michael Kreitz, Haimhausen (DE); Juergen Leschhorn, Geltendorf (DE); Andreas Wolf, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 338 days.

(21) Appl. No.: 17/631,129

(22) PCT Filed: Aug. 14, 2020

(86) PCT No.: PCT/EP2020/072831
§ 371 (c)(1),
(2) Date: Jan. 28, 2022

(87) PCT Pub. No.: WO2021/043562
PCT Pub. Date: Mar. 11, 2021

(65) Prior Publication Data
US 2022/0258586 A1    Aug. 18, 2022

(30) Foreign Application Priority Data
Sep. 5, 2019    (DE) .................... 10 2019 123 845.5

(51) Int. Cl.
*B60K 1/04*    (2019.01)
*B60L 50/60*    (2019.01)

(52) U.S. Cl.
CPC .............. *B60K 1/04* (2013.01); *B60L 50/66* (2019.02); *B60K 2001/0438* (2013.01)

(58) Field of Classification Search
CPC .... B60K 1/04; B60K 2001/0438; B60L 50/66
See application file for complete search history.

(56) References Cited

U.S. PATENT DOCUMENTS

| 4,898,419 A * | 2/1990 | Kenmochi | ......... B62D 25/2036 428/116 |
| 11,450,907 B2 * | 9/2022 | Cassard | .............. H01M 10/613 |

(Continued)

FOREIGN PATENT DOCUMENTS

| CN | 202174925 U | 3/2012 |
| CN | 103303374 A | 9/2013 |

(Continued)

OTHER PUBLICATIONS

English translation of Chinese Office Action issued in Chinese Application No. 202080050665.7 dated Jun. 2, 2023 (7 pages).

(Continued)

*Primary Examiner* — Brian L Swenson
(74) *Attorney, Agent, or Firm* — Crowell & Moring LLP (57) ABSTRACT

An energy store-floor assembly for a motor vehicle includes an electrical energy storage device that has a plurality of battery modules and that is accommodated in a multipart storage housing and arranged on the underside of a vehicle floor of the motor vehicle. In order to provide an energy store-floor assembly for a motor vehicle in which the energy storage device is connected to the motor vehicle bodyshell in an improved manner, the battery modules of the energy storage device are connected to the vehicle floor in a central region of the storage housing by way of a plurality of mechanical connecting elements.

22 Claims, 6 Drawing Sheets

(56) References Cited

U.S. PATENT DOCUMENTS

| | | | |
|---|---|---|---|
| 11,462,793 B2* | 10/2022 | Kagami | B60K 1/04 |
| 2012/0161429 A1 | 6/2012 | Rawlinson et al. | |
| 2012/0161472 A1* | 6/2012 | Rawlinson | B60R 16/04 |
| | | | 296/187.08 |
| 2012/0237803 A1* | 9/2012 | Mardall | H01M 10/653 |
| | | | 429/53 |
| 2014/0166381 A1 | 6/2014 | Ling et al. | |
| 2014/0284125 A1 | 9/2014 | Katayama et al. | |
| 2015/0375623 A1 | 12/2015 | Galamb | |
| 2017/0305249 A1 | 10/2017 | Hara | |
| 2018/0345778 A1 | 12/2018 | Yamanaka | |
| 2019/0168624 A1 | 6/2019 | Peer et al. | |

FOREIGN PATENT DOCUMENTS

| | | |
|---|---|---|
| CN | 203787484 U | 8/2014 |
| CN | 105313659 A | 2/2016 |
| CN | 106494208 A | 3/2017 |
| CN | 208336323 U | 1/2019 |
| CN | 109641534 A | 4/2019 |
| CN | 109693718 A | 4/2019 |
| CN | 209071465 U | 7/2019 |
| DE | 38 09 185 C2 | 10/1988 |
| DE | 10 2014 215 616 A1 | 2/2016 |
| DE | 10 2017 206 566 A1 | 10/2017 |
| DE | 10 2018 211 469 A1 | 1/2020 |
| EP | 2 468 609 A2 | 6/2012 |
| JP | 6-219336 A | 8/1994 |

OTHER PUBLICATIONS

International Search Report (PCT/ISA/210) issued in PCT Application No. PCT/EP2020/072831 dated Nov. 17, 2020 with English translation (five (5) pages).

German-language Written Opinion (PCT/ISA/237) issued in PCT Application No. PCT/EP2020/072831 dated Nov. 17, 2020 (five (5) pages).

German-language Search Report issued in German Application No. 10 2019 123 845.5 dated Aug. 4, 2020 with partial English translation (ten (10) pages).

English translation of Chinese-language Office Action issued in Chinese Application No. 202080050665.7 dated Dec. 7, 2023 (9 pages).

* cited by examiner

ENERGY STORE-FLOOR ASSEMBLY FOR A MOTOR VEHICLE

BACKGROUND AND SUMMARY OF THE INVENTION

The invention relates to an energy store floor assembly for a motor vehicle.

An energy store floor assembly of this type is already known from EP 2 468 609 A2, in which a vehicle floor of the floor assembly is delimited laterally by means of respective side sills and is stiffened by longitudinal members and/or crossmembers. A plurality of battery modules of an electrical energy storage device, which is used to supply an electric drive of the motor vehicle with electrical energy, is accommodated in a multipart storage housing. The storage housing has a frame-like construction of profiled elements running around on the outer peripheral side, and a plurality of crossmembers, and therefore the storage housing is intrinsically stiff and is fixed to the underside of the vehicle floor via a plurality of respective screw connections in the region of the side sills and the cross-members. Accordingly, the high mass forces of the heavy battery modules are transmitted only indirectly to the bodyshell of the motor vehicle via the screw connections arranged on the outside of the storage housing.

The problem here is that, due to the very high weight of the energy storage device, it is possible for considerable vibrations to occur in its central region during driving operation, for example.

It is an object of the present invention to create an energy store floor assembly for a motor vehicle, in which the energy storage device is connected to the motor vehicle bodyshell in an improved way.

According to the invention, this object is achieved by an energy store floor assembly having the features of the independent claim. Advantageous refinements with beneficial developments are the subject matter of the dependent claims.

The energy store floor assembly according to the invention has an energy storage device which is formed from a plurality of battery modules, is accommodated in a multipart storage housing, and is arranged on the underside of a vehicle floor. In order to create an energy store floor assembly for a motor vehicle, in which the energy storage device is connected to the motor vehicle bodyshell in an improved way, the battery modules of the energy storage device are connected to the vehicle floor in a central region of the storage housing via a plurality of mechanical connecting elements. As a result of this direct attachment or suspension of the battery modules of the energy storage device on the vehicle floor, the acting mass forces of the very heavy battery modules can be transmitted extremely uniformly to the bodyshell, in particular to the vehicle floor, even in the central region of the energy storage device, which not least improves the dynamic properties and considerably reduces vibrations originating from the energy storage device.

An advantageous refinement of the invention provides for an underside housing part of the storage housing to be fixed to the vehicle floor via at least one of the connecting elements, which passes through the storage housing and is sealed off in a gastight manner both with respect to the underside housing part and also the vehicle floor. The respective connecting elements thus pass preferably through an interior of the storage housing, in order to ensure the beneficial fixing of the further housing part to the underside of the vehicle floor, even in a central region of the storage housing. Thus, for example, vibrations due to the weight of the energy storage device can be reduced and particularly beneficial fixing of the further housing part and of the energy storage device to the underside of the vehicle floor and to the motor vehicle body can be implemented.

In a further advantageous embodiment of the invention, the respective connecting element has a supporting element, which is formed as a structural element, in particular as a pressure plate, of a respective battery pack. Thus, the respective battery pack is fixed particularly stably to the vehicle floor and to the vehicle bodyshell.

Furthermore, it has been shown to be advantageous if the connecting element comprises a screw element or similar clamping element, by means of which the underside housing part of the storage housing is clamped to the vehicle floor with the interposition of the supporting element. In this way, the underside housing part of the underside is also connected very stably to the vehicle floor.

In this connection, it has been shown to be further advantageous if the screw element or similar clamping element passes through the underside housing part and the vehicle floor via a respective opening, and if the screw element or similar clamping element is sealed off with respect to the underside housing part and the vehicle floor via a gastight seal. This results in a reliable, gastight connection between the connecting element and the components of the storage housing, the vehicle floor and the underside housing part.

In an advantageous refinement of the invention, the vehicle floor is additionally formed as a housing part of the storage housing and is connected to at least one further housing part of the storage housing via at least one gastight connection. Thus, the storage housing according to the invention, firstly, is formed by a vehicle floor on the body side or bodyshell side and, secondly, at least one further housing part not belonging to the body or to the bodyshell, which vehicle floor and housing part are connected to each other in the region of the gastight connection. The use of the vehicle floor firstly as a part of the motor vehicle body or the bodyshell and secondly as a housing part of the storage housing has the advantages of a dual use, which leads to a considerable saving on installation space, weight and manufacturing effort. Furthermore, the energy storage device is thus accommodated in a storage housing integrated into the body or bodyshell, and therefore the energy storage device, in respect of crash requirements, for example, is integrated particularly beneficially on the body side or bodyshell side. In order, for example in a correspondingly severe accident or other emergency, to avoid an escape of a gas from the storage housing, such as arises within the energy storage device, for example as a consequence of the accident or an emergency, the gastight connection according to the invention is provided between the vehicle floor on the bodyshell side or body side and the corresponding housing part not belonging to the bodyshell or to the body. Via this gastight connection between the vehicle floor and the further housing part, the required tightness of the storage housing is thus ensured even in an emergency.

A further refinement of the invention is distinguished by the fact that the further housing part has a bead or similar spacer element in the region of the mechanical connecting element, which means that the housing part to the side of the bead or similar spacer element has a spacing from the respective battery module. This has the advantage that small or medium deformations of the floor element do not lead to contact with the energy storage device or the battery packs having the battery modules, in order in this way to avoid corresponding damage.

A further advantageous refinement of the invention provides for the vehicle floor to be formed as part of the painted motor vehicle bodyshell. Accordingly, an energy store floor assembly has proven to be particularly advantageous in which the vehicle floor is mounted in the bodyshell in the usual way and then can be provided with appropriate paint layers within the context of cathodic dip painting and, if appropriate, within the context of further painting, after which the assembly of the storage housing can be carried out with the formation of the gastight connection. As a result, a method that is particularly simple and quick in terms of manufacture can be achieved in this way.

The further housing part in a further refinement of the invention is formed as a floor element external to the bodyshell. Such a floor element external to the bodyshell can be produced particularly beneficially and, for example, can perform corresponding functions with regard to protection of the energy storage device arranged above the floor element. Thus, the floor element can be created, for example, from an appropriate material or in an appropriate design, such that, as a so-called bollard protector, in the event that the underbody or the floor element mounts a rock, a bollard, a curb stone or similar, it has sufficient rigidity and stability with respect to intrusion or similar, in order in this way to avoid damage to the energy storage device.

Finally, an advantageous refinement of the invention is distinguished by the fact that the underside housing part and the vehicle floor, as a housing part of the storage housing, are connected via a gastight connection, which runs around the storage housing on the outer peripheral side. In this way, the entire storage housing is likewise particularly beneficially secured against an escape of gas.

Further features of the invention are gathered from the claims, the figures and the figure description. The features and feature combinations mentioned above in the description and the features and feature combinations mentioned below in the figure description and/or shown on their own in the figures can be used not only in the respectively specified combination but also in other combinations or on their own.

The invention will now be explained in more detail by using a preferred exemplary embodiment and with reference to the drawings.

DETAILED DESCRIPTION OF THE DRAWINGS

Figure 1:
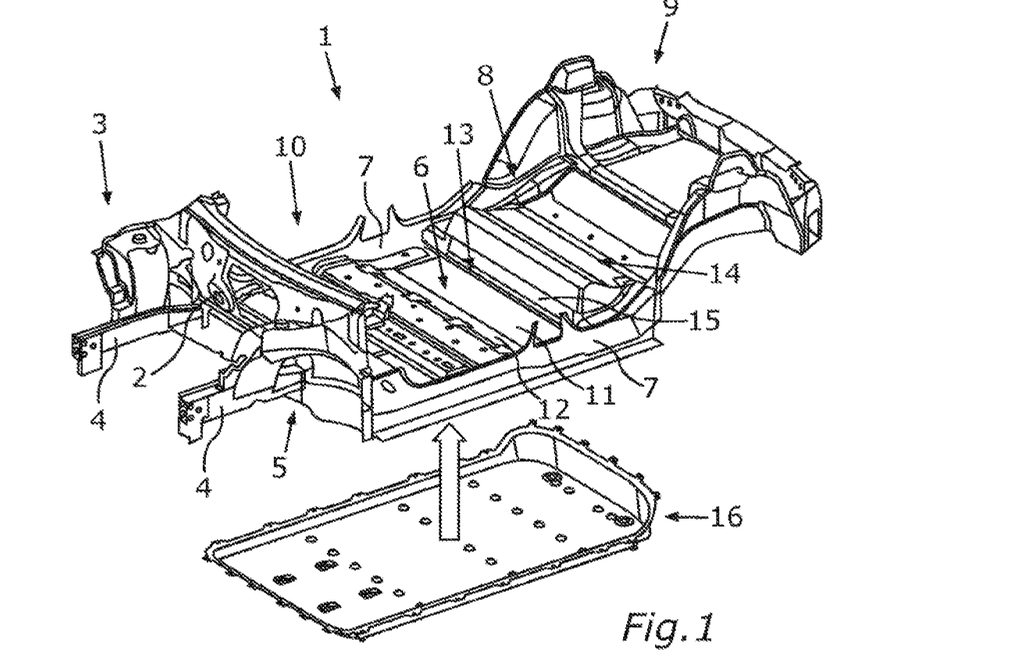
FIG. 1 is an exploded illustration of an energy store floor assembly for a motor vehicle according to one embodiment, in which a vehicle floor or a motor vehicle body forms a housing part of a storage housing, on which a floor element can be placed in accordance with the arrow illustrated as a further housing part of the storage housing, which means that a gastight storage housing for receiving an electrical energy storage device comprising one or more battery modules is created.
Figure 2:
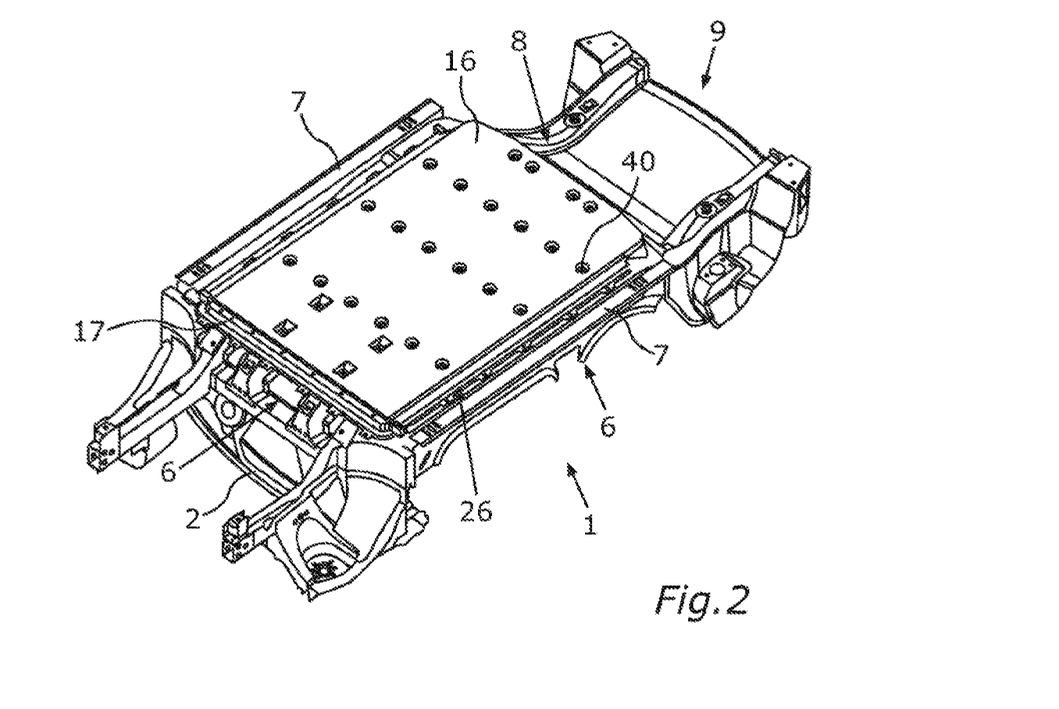
FIG. 2 is a perspective bottom view of the energy store floor assembly having the storage housing according to the embodiment in FIG. 1.

A motor vehicle body 1 for an electrically operable motor vehicle is illustrated in FIGS. 1 and 2 in a perspective exploded view and a perspective bottom view, respectively. This motor vehicle can be, for example, one having a fully electric drive (BEV) or a hybrid vehicle (PHEV) which, besides a purely electric drive, also has an internal combustion engine. The motor vehicle body 1 in the present case comprises in a conventional manner a front end wall 2 of a passenger compartment, which is adjoined toward the front by a front-end structure 3, which, for example, comprises respective longitudinal members/engine supports 4 of a central longitudinal member plane. Toward the rear, the front wall 2 merges into a transition region 5 which, for example, comprises a pedal floor or similar extending obliquely, into a vehicle floor 6, which delimits the passenger compartment at the bottom and reaches as far as side sills 7—extending in the vehicle longitudinal direction on the outside and horizontally. Toward the rear, the vehicle floor 6 extends as far as a transition region 8, in which the vehicle floor 6 merges into a rear vehicle structure 9.

Figure 3:
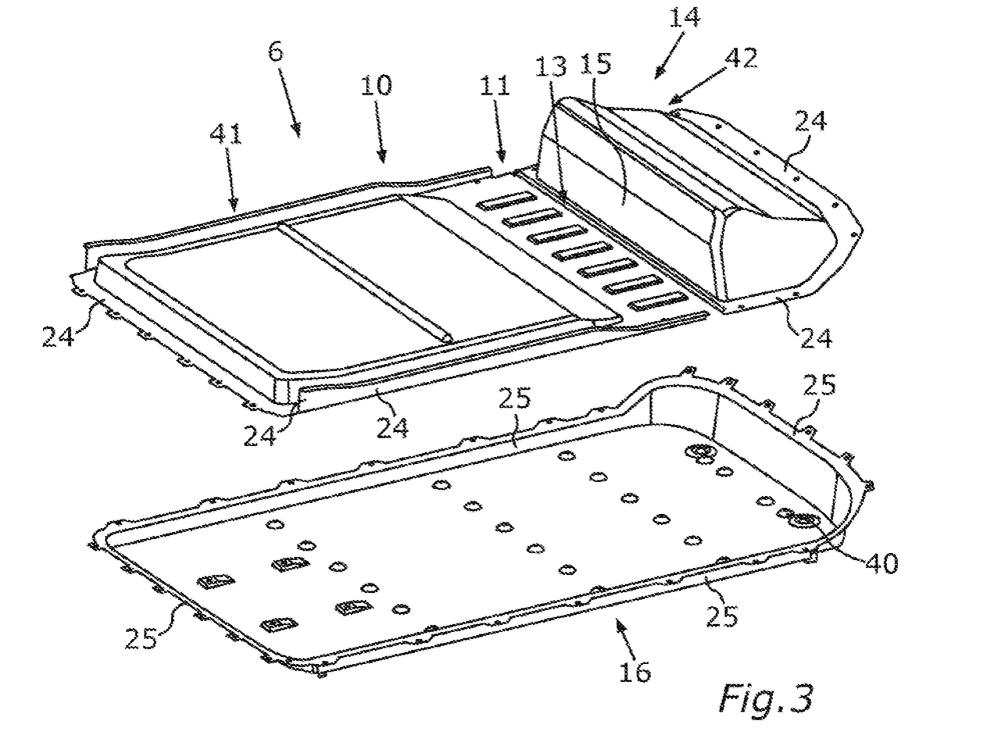
FIG. 3 shows respective perspective views of the vehicle floor, illustrated here in two parts, separately from the motor vehicle body, and of the floor element external to the bodyshell, formed as a further housing part of the storage housing, which vehicle floor and floor element here are connected to each other via a gastight connection on the outer peripheral side.

In FIG. 3, the vehicle floor 6 is illustrated in a perspective illustration, separately from the motor vehicle body 1. Here, it can be seen firstly that the vehicle floor 6 comprises a one-part main floor 10 which, in the vehicle longitudinal direction, extends forward at least as far as the transition region 5 to the front end wall 2 and rearward at least as far as a floor area 11 underneath and behind a front row of vehicle seats. The position of this front row of vehicle seats can be seen in FIG. 1 by means of respective seat cross-members 12, on which the respective row of vehicle seats of the front row of seats rest.

The main floor 10 of the vehicle floor 6 is formed in one piece and, via a connection extending in the vehicle transverse direction, is connected in a gastight manner 13 to a rear floor element 14 which, for example, extends underneath a rear row of vehicle seats and comprises what is known as a heel wall or a heel element 15, which is arranged underneath the rear row of vehicle seats. The gastight connection 13 between the main floor 10 and the rear floor element 14 can be formed, for example, by a jointed connection and/or a mechanical connection and in addition via at least one sealing element. Both the main floor 10 and the rear floor element 14 extend over the at least substantially entire vehicle width, such that the vehicle floor 6 comprises a total of only two structural elements, namely the main floor 10 and the rear floor element 14. A one-piece configuration of the vehicle floor 6 would likewise be conceivable, just like a multipart configuration. However, a multipart configuration increases the sealing measures considerably.

Apart from the vehicle floor 6, the energy store floor assembly comprises a further housing element in the form of a floor panel or a floor element 16 which—as can be seen in particular from FIGS. 1 to 4—is configured in one piece and, in the exemplary embodiment shown here, to be at least substantially flat as far as an edge region. In particular in a joint view of FIGS. 1 to 3, it can be seen that the floor element 16 and the vehicle floor 6 form respective housing parts of a storage housing 17, which is designed to receive an electrical energy storage device 19 which can be seen in FIGS. 4 to 10 and comprises a plurality of respective battery modules 18. These battery modules 18 are assembled to form a respective battery pack 20, illustrated in FIG. 7, wherein respective supporting elements in the form of pressure plates 21 are provided, which are connected to one another via corresponding clamping elements 22 and clamp the individual battery modules 18 to one another.

Figure 4:
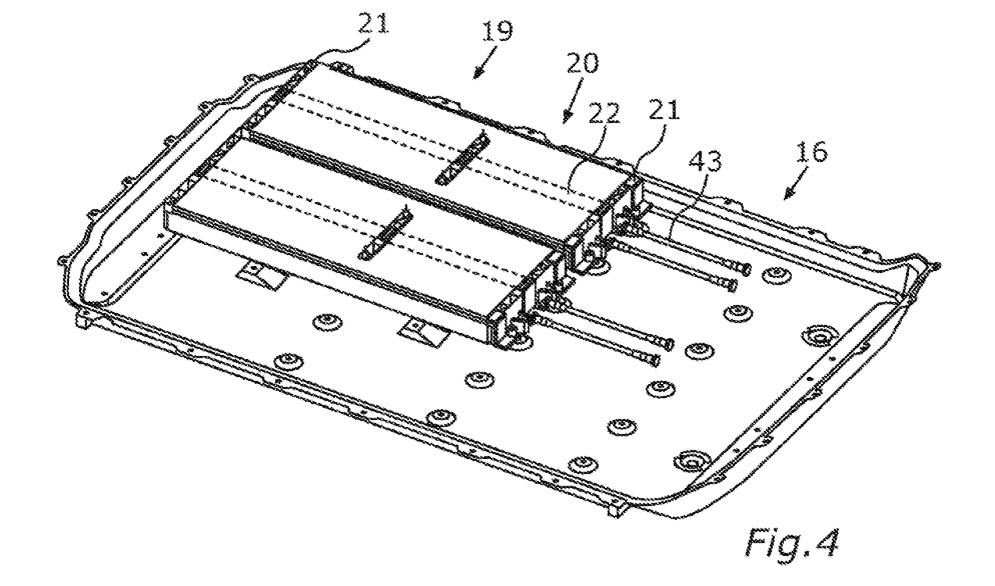
FIG. 4 is a perspective view of the floor element according to the first embodiment, on which a plurality of battery modules of the energy storage device can be seen on the upper side.

Two of these battery packs 20 in their arrangement provided on the upper side of the floor element 16 are illustrated in FIG. 4 in a perspective view of the floor element 16.

Overall, it thus becomes clear that the two-part vehicle floor 6 and the floor element 16 represent the housing parts which form the storage housing 17 for the energy storage device 19. Thus, amongst other things, it is necessary that these two housing parts—the vehicle floor 6 on the bodyshell side and the floor element 16 external to the bodyshell—have to be connected to each other by a gastight connection 26 which runs around on the outer peripheral side and which can be seen in FIG. 5 in a detailed and perspective sectional view of the energy store floor assembly.

Figure 5:
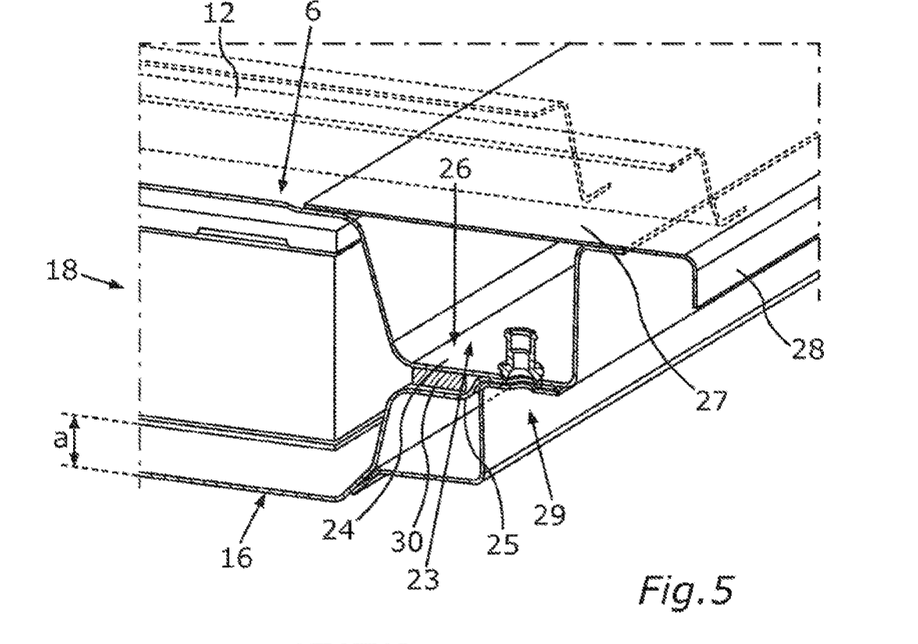
FIG. 5 is a detailed and perspective sectional view of the gastight connection of the vehicle floor as the one housing part and of the floor element as the further housing part of the storage housing.

In a predominantly front longitudinal region of the main floor 10, the vehicle floor 6 has a bead 23, which can be readily seen in FIG. 5, is substantially U-shaped in cross section and by means of which a respective support element is formed, which stiffens the vehicle floor 6, in particular in the vehicle longitudinal direction, and moreover provides a connecting region or flange 24 of the vehicle floor 6, which, together with a flange 25 on the side of the floor element 16, effects the gastight connection 26. The support element or the bead 23 is closed here on the upper side by a closing element, for example a closing plate 27, for stiffening purposes. In the vehicle transverse direction or laterally beyond the support element 23, the vehicle floor 5 in the region of the main floor 10 extends as far as a flange 28, with which the vehicle floor 6 is connected to the laterally associated side sill 7. It is accordingly apparent that the respective support element 23, which also forms the flange 24 for the gastight connection 26 to the floor element 16, is arranged with a lateral spacing or, in the vehicle transverse direction, with a spacing from the respective side sill 7. Hence, the storage housing 17 accordingly ends with a lateral spacing on the inner side of the respective side sill 7. This has particularly beneficial advantages, for example in a side impact.

The vehicle floor 6 is further stiffened on the upper side not only by the seat crossmembers 12, but additional, specific crossmembers are provided in order to increase the stiffness of the energy store floor assembly. This makes it possible for the storage housing 17 to manage without substantial stiffening elements or for the entire energy store with the storage housing 17 and the energy storage device 19 to be formed as an integral component part of the motor vehicle body 1 or of the bodyshell.

It can be seen once more, in particular from FIG. 2, that the floor element 16 and thus the entire storage housing 17 ends with a lateral spacing from the respective side sill 7. Toward the front, the floor element extends as far as the transition region 5 between the vehicle floor 6 and the front wall 2. In this region, the gastight connection 26 between the floor element 16 and the vehicle floor 6 also extends peripherally. Toward the rear, floor element 16 or the rear floor element 14 of the vehicle floor 16 extends as far as the transition region 8 to the rear vehicle structure 9. The gastight connection 26 is also provided in this region, and is accordingly formed running substantially rectangularly peripherally around the two housing parts—the vehicle floor 6 and the floor element 16.

It can be seen in particular from FIG. 5 that the gastight connection 6 or the flanged connection comprises a plurality of mechanical connecting elements, in the present case in the form of respective screw connecting elements 29 which—based on the sealing direction—are arranged on the outside of a seal 30 running between the flanges 24 and 25 in the region of the flanged connection. In other words, the sealing of the storage housing 17 by means of the seal 30 is preferably carried out on the inside of the respective mechanical connecting elements 29, such that the latter do not themselves have to be sealed, but rather only the two flanges 24, 25 with respect to each other. The screw connecting elements 29 ensure compression not only of the respective flanges 24, 25 but, if appropriate, also of the seal 30. This seal 30 can be, for example, an insert seal (in particular a flat seal or a profiled seal), a disperse seal (adhering on one side or adhering on both sides), or a bonded-on seal. Here, widely used solutions are known to a person skilled in the art.

In the present case, the vehicle floor 6 is formed as part of the painted motor vehicle bodyshell (body-in-white) and, accordingly, is produced jointly with the motor vehicle body 1 in a bodyshell assembly. After that, the motor vehicle body 1 and thus also the vehicle floor 6 are provided with appropriate paint layers, for example within the context of cathodic dip painting, and, if appropriate, also a further painting step. The assembly of the energy storage device 19 and of the floor element 16 and the creation of the entire energy store and the storage housing 17 are accordingly carried out in a following assembly step outside the bodyshell.

The fixing of the respective battery packs 20 or battery modules 18 can be readily seen in particular from FIGS. 6 to 10. For this purpose, a plurality of respective mechanical connecting elements 31 are provided, by means of which the further housing part, in the form of the floor element 16, and the vehicle floor 6 are connected to each other in a central region of the storage housing 17. The mechanical connecting elements 31 have substantially two functions and advantages: firstly, the respective battery modules 18 and battery packs 20 are arranged directly with the vehicle floor 6 in a quasi-suspended arrangement or between the vehicle floor 6 and the floor element 16, and, secondly, the floor element 16 itself is connected stiffly and stably to the vehicle floor 6 even in a central region by the mechanical connecting elements 31. The result is an extremely stable energy store, which is connected directly to the vehicle floor 6 not only at the edge in the region of the gastight connection 26 but also in the central region.

Figure 6:
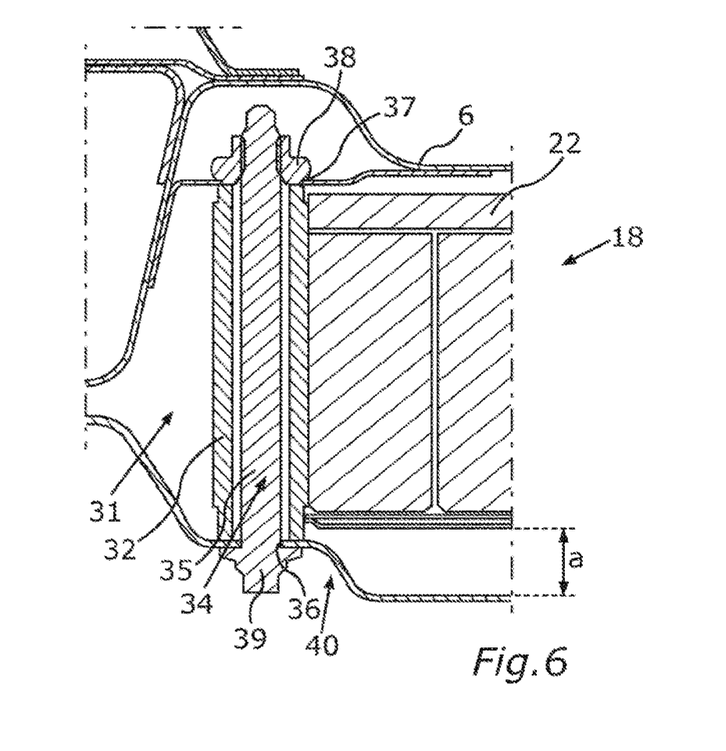
FIG. 6 is a detailed sectional view through the storage housing in the region of a mechanical connecting element between the vehicle floor and the floor element, wherein the mechanical connecting element has a supporting element in the form of a pressure plate of a respective battery pack of the energy storage device.
Figure 7:
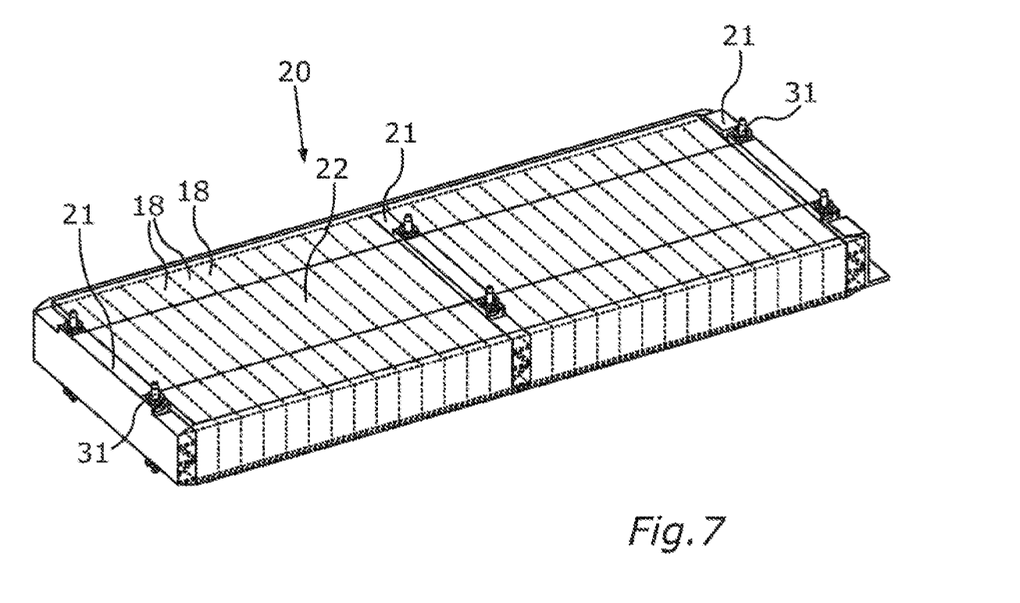
FIG. 7 is a perspective view of one of the battery packs of the energy storage device with respective pressure plates, which have corresponding supporting elements for connecting the vehicle floor to the floor element.

Each of the mechanical connecting elements 31 comprises a supporting element 32 which, in the present case—as can be seen in particular from FIGS. 4 and 7—is formed as a respective pressure plate 21 of the respective battery pack 20. This respective supporting element or the respective pressure plate 32 is penetrated by a passage opening 33 for a screw element 34, as can be seen, for example, with reference to FIG. 6 in a detailed sectional view through the energy store floor assembly or with reference to FIG. 8, which likewise shows a detailed and perspective sectional view through the energy store floor assembly, wherein the screw element 34 passes not only through the respective pressure plate 21 of the corresponding battery module 18 or battery pack 20 but also through the respective housing parts of the storage housing 17, namely the floor element 16 and the vehicle floor 6.

Figure 10:
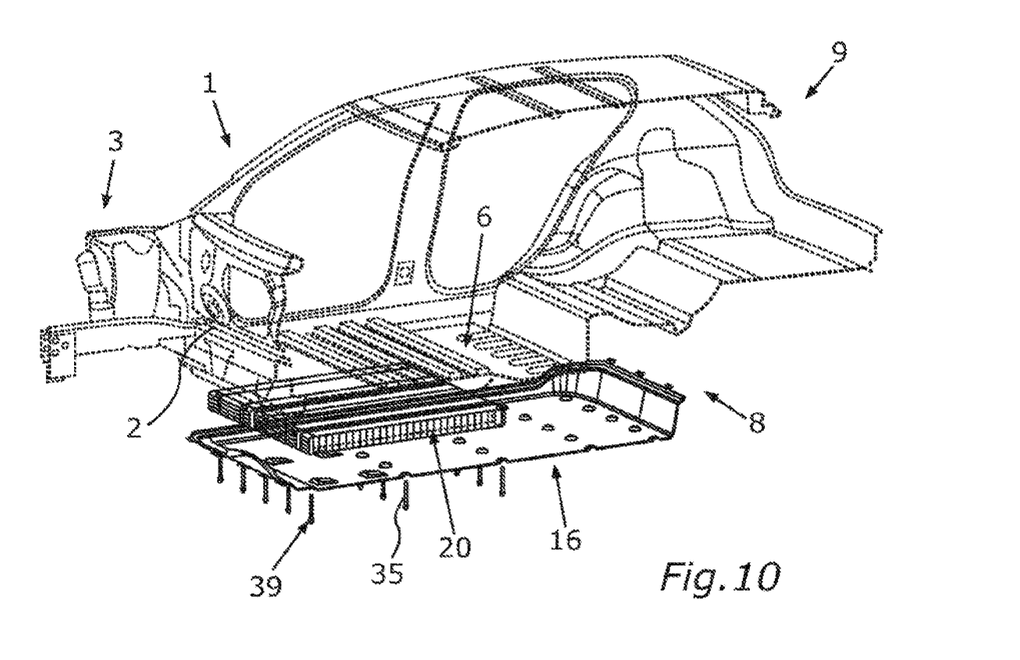
FIG. 10 is shows a perspective exploded illustration of the motor vehicle body with the energy store floor assembly according to FIG. 9.

As can be seen in a joint view with FIG. 10, here respective screws 35 are pushed in via respective openings 36 in the floor element 16 and via the passage opening 33 in the respective pressure plate 21 and led out of the vehicle floor 6 again on the upper side through a respective opening 37 and locked with a screw nut 38. By tightening the respective screw elements 34, firstly the floor element 16 is clamped against the vehicle floor 6—with the interposition of the respective pressure plate 21—and, secondly, the respective battery pack 20 having the multiplicity of battery modules 18 is fixed to the underside of the vehicle floor 6.

Between a screw head 39 of the respective screw 35 and the floor element 16, on the one hand, and the respective screw nut 38 and the vehicle floor 6, on the other hand, a gastight seal, which cannot be seen further here, is in each case provided, such that overall each of the mechanical connecting elements 31 is likewise formed in a gastight manner, and therefore, for example in an emergency situation or an accident, gas generated by the energy storage device cannot reach the outside or the vehicle interior via the connecting elements.

Figure 8:
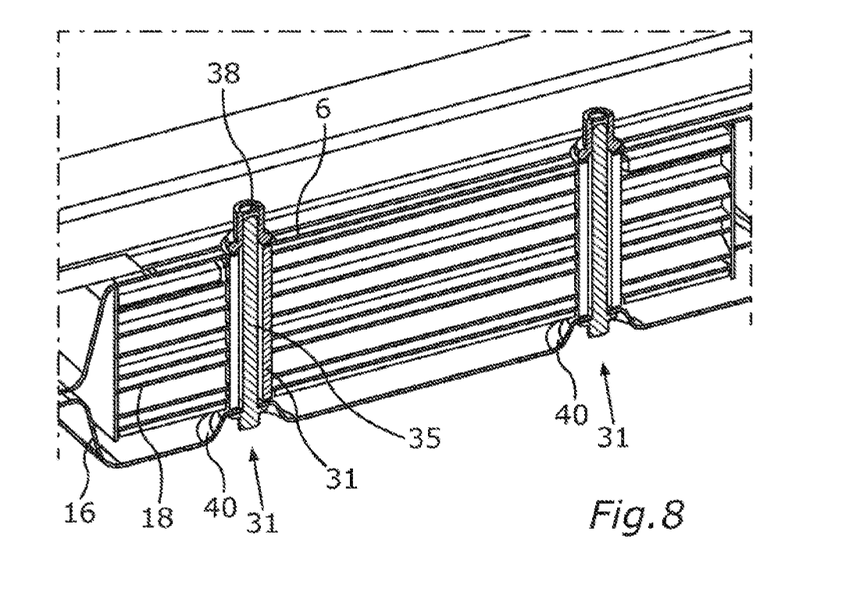
FIG. 8 is a detailed and perspective sectional view of two further mechanical connecting elements for connecting the vehicle floor to the floor element in a way analogous to that according to FIG. 6.
Figure 9:
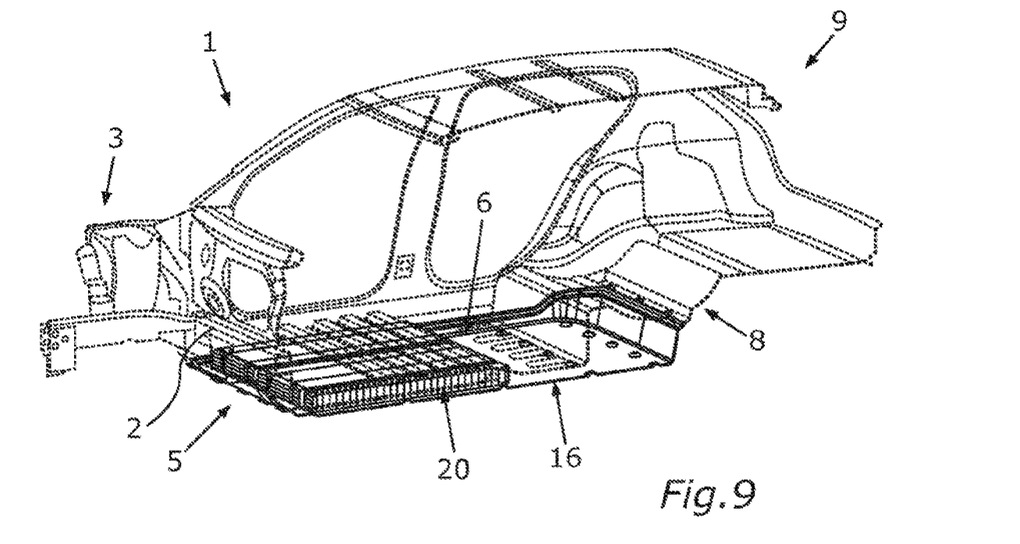
FIG. 9 is a perspective sectional view through the motor vehicle body with the energy store floor assembly described with reference to FIGS. 1 to 8.

Furthermore, it can be seen in particular from FIGS. 6 and 8 that, in the region of the openings 36 for the respective screws 35, the floor element 16 has respective beads 40, on which the respective supporting elements in the form of the pressure plates 21 are supported on the inside. This achieves the situation in which the floor element 16—with the exception of the region of the beads 40—is arranged with a spacing a from the energy storage device 19 having the battery packs 20 of the battery modules 18. This has the advantage that small or medium deformations of the floor element 16 do not lead to contact with the energy storage device 19 or the battery packs 20 having the battery modules 18.

As can be seen from FIG. 6, the respective pressure plate 21 or another type of supporting element can moreover project downward on the underside of the respective battery pack 20 or the respective battery module 18, so that the spacing a becomes even larger as a result. In this way, the regions close to the beads 40 can also be better protected.

Moreover, in a joint view of FIGS. 3 and 4, it becomes clear that the battery packs 20 having the battery modules 18 are arranged in a front portion of the storage housing 17. For this purpose, in its front portion, which extends approximately over three quarters of its length in the vehicle longitudinal direction, the main floor 10 has a cube-like elevation 41. The rear floor element 14 of the vehicle floor 6 also has a corresponding elevation 42, specifically toward the rear starting from the heel wall 15. In this region, for example connections or power electronics and additional components such as circuit breakers or similar can be provided. In a region between the two elevations 41, 42 that is arranged at the level of the floor region 11, there are lines 43 which can be seen only in FIG. 4, and therefore in this region the storage housing 17 has a smaller cross section.

An outlet device for a gaseous or liquid medium can also be provided in the storage housing 17, to be specific in particular in the floor element 16. In this way, a specific discharge is possible, for example of gas which, for example, is generated by the energy storage device 19 in an emergency or during a collision. For example, via such an outlet device, water which has entered the storage housing 17 as a result of damage or in some other way, can also be discharged from the storage housing 17.

Figure 11:
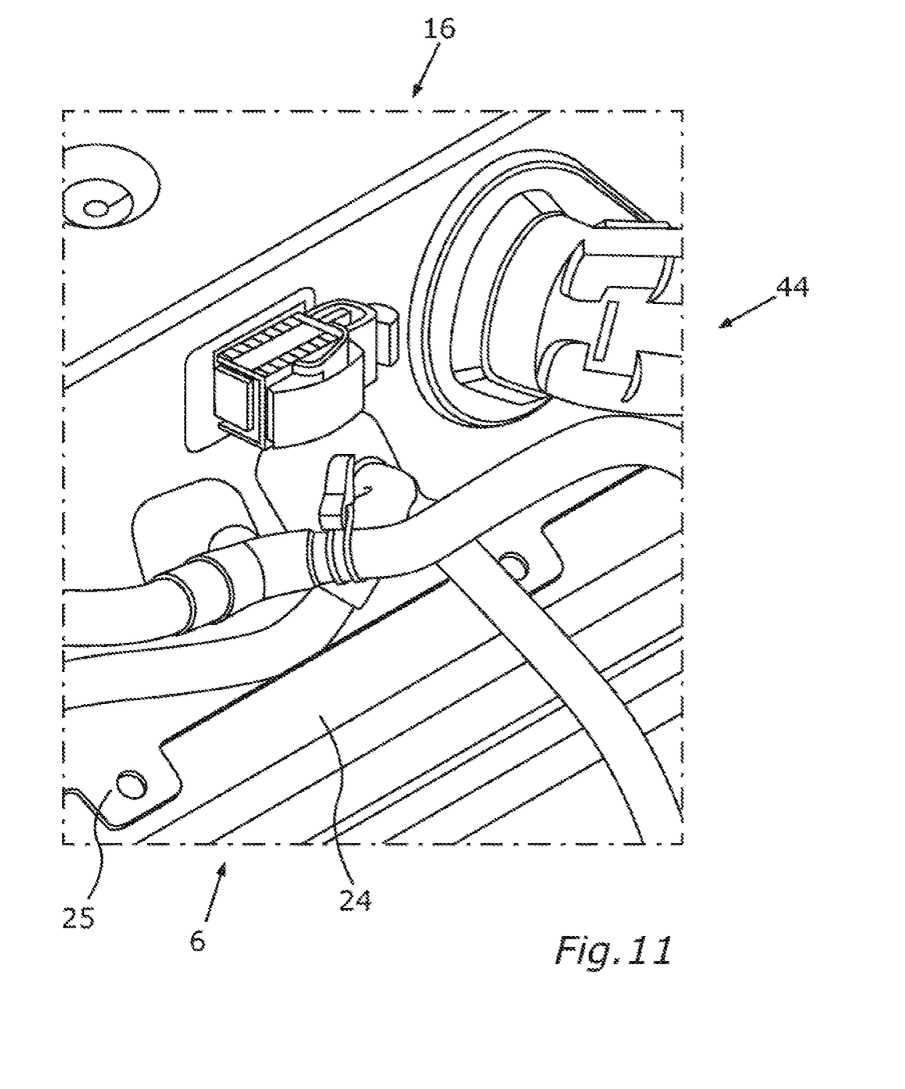
FIG. 11 is a detailed perspective view of a plurality of respective line and connecting elements of the energy storage device with structural elements of the motor vehicle that are positioned outside the storage housing and pass through the storage housing in the region of the floor element.

Finally, in a detailed and perspective view of the underside, FIG. 11 shows the floor element 16, in the region of which here multiple line and connecting elements of the energy storage device 19 are led to the outside. Via these line and connecting elements 44, components positioned, for example, within the storage housing 17, can be connected to components of the motor vehicle arranged outside the storage housing 17, in particular of its electric drive. Here, the line and connecting elements 44 are also sealed off in a gastight manner in the passage area by the corresponding wall of the floor element 16.

By means of the storage housing 17 according to the invention, the gastight accommodation and arrangement of the energy storage device 19 is thus firstly ensured and, secondly, the storage housing 17 itself is formed as an integral component part of the motor vehicle body or the bodyshell, since it is firstly formed from a housing part on the body side, specifically the vehicle floor 6 and, secondly, from a housing part external to the bodyshell, namely the floor element 16. This configuration makes it possible for the motor vehicle body to perform substantial stiffness and stability functions of the storage housing 17, such that the latter manages at least substantially without supports.

LIST OF DESIGNATIONS

1 Motor vehicle body
2 Front wall
3 Front-end structure
4 Longitudinal member
5 Transition region
6 Vehicle floor
7 Side sill
8 Transition region
9 Rear vehicle structure
10 Main floor
11 Floor area
12 Seat crossmember
13 Gastight connection
14 Floor element
15 Heel wall 16 Floor element
17 Storage housing
18 Battery module
19 Energy storage device
20 Battery pack
21 Pressure plate
22 Clamping elements
23 Bead/support element
24 Flange
25 Flange
26 Gastight connection
27 Closing plate
28 Flange
29 Connecting elements
30 Seal
31 Connecting elements
32 Pressure plate
33 Passage opening
34 Screw element
35 Screw
36 Opening
37 Opening
38 Screw nut
39 Screw head
40 Beads
41 Elevation
42 Elevation
43 Line
44 Connecting element
a Spacing

What is claimed is:

1. An energy store floor assembly for a motor vehicle, comprising:
   an electrical energy storage device which comprises a plurality of battery modules;
   a multipart storage housing in which the energy storage device is accommodated, wherein the energy storage device is arranged on an underside of a vehicle floor of the motor vehicle; and
   a plurality of mechanical connecting elements by which the plurality of battery modules of the energy storage device are directly connected to the vehicle floor in a central region of the storage housing.

2. The energy store floor assembly according to claim 1, wherein
   an underside housing part of the storage housing is fixed to the vehicle floor via at least one of the connecting elements, which passes through the storage housing and is sealed off in a gastight manner both with respect to the underside housing part and also the vehicle floor.

3. The energy store floor assembly according to claim 2, wherein
   the underside housing part is formed as a floor element external to a motor vehicle bodyshell.

4. The energy store floor assembly according to claim 3, wherein
   the underside housing part and the vehicle floor, as a housing part of the storage housing, are connected via a gastight connection, which connection extends around the storage housing on an outer peripheral side.

5. The energy store floor assembly according to claim 1, wherein
   a respective connecting element comprises a supporting element, which is formed as a pressure plate of a respective battery pack.

6. The energy store floor assembly according to claim 5, wherein
   the connecting element comprises a clamp, by which an underside housing part of the storage housing is clamped to the vehicle floor with interposition of the supporting element.

7. The energy store floor assembly according to claim 6, wherein
   the clamp is a screw.

8. The energy store floor assembly according to claim 7, wherein
   the screw passes through the underside housing part and the vehicle floor via a respective opening, and
   the screw is sealed off with respect to the underside housing part and the vehicle floor via a gastight seal.

9. The energy store floor assembly according to claim 6, wherein
   the clamp passes through the underside housing part and the vehicle floor via a respective opening, and
   the clamp is sealed off with respect to the underside housing part and the vehicle floor via a gastight seal.

10. The energy store floor assembly according to claim 1, wherein
    the vehicle floor is formed as a housing part of the storage housing and is connected to at least one further housing part of the storage housing via at least one gastight connection.

11. The energy store floor assembly according to claim 10, wherein
    the further housing part has a bead or spacer in a region of the mechanical connecting element, which provides a spacing of the housing part from the respective battery module.

12. The energy store floor assembly according to claim 1, wherein
    the vehicle floor is formed as part of a painted motor vehicle bodyshell.

13. An energy store floor assembly for a motor vehicle, comprising:
    an electrical energy storage device which comprises a plurality of battery modules;
    a multipart storage housing in which the energy storage device is accommodated, wherein the energy storage device is arranged on an underside of a vehicle floor of the motor vehicle; and
    a plurality of mechanical connecting elements by which the plurality of battery modules of the energy storage device are connected to the vehicle floor in a central region of the storage housing;
    wherein an underside housing part of the storage housing is fixed to the vehicle floor via at least one of the connecting elements, which passes through the storage housing and is sealed off in a gastight manner both with respect to the underside housing part and also the vehicle floor; and,
    wherein a respective connecting element comprises a supporting element, which is formed as a pressure plate of a respective battery pack.

14. The energy store floor assembly according to claim 13, wherein
    the connecting element comprises a clamp, by which an underside housing part of the storage housing is clamped to the vehicle floor with interposition of the supporting element.

15. The energy store floor assembly according to claim 14, wherein
    the clamp is a screw.

16. The energy store floor assembly according to claim 15, wherein
the screw passes through the underside housing part and the vehicle floor via a respective opening, and
the screw is sealed off with respect to the underside housing part and the vehicle floor via a gastight seal.

17. The energy store floor assembly according to claim 14, wherein
the clamp passes through the underside housing part and the vehicle floor via a respective opening, and
the clamp is sealed off with respect to the underside housing part and the vehicle floor via a gastight seal.

18. The energy store floor assembly according to claim 13, wherein
the vehicle floor is formed as a housing part of the storage housing and is connected to at least one further housing part of the storage housing via at least one gastight connection.

19. The energy store floor assembly according to claim 18, wherein
the further housing part has a bead or spacer in a region of the mechanical connecting element, which provides a spacing of the housing part from the respective battery module.

20. The energy store floor assembly according to claim 13, wherein
the vehicle floor is formed as part of a painted motor vehicle bodyshell.

21. The energy store floor assembly according to claim 13, wherein
the underside housing part is formed as a floor element external to a motor vehicle bodyshell.

22. The energy store floor assembly according to claim 21, wherein
the underside housing part and the vehicle floor, as a housing part of the storage housing,
are connected via a gastight connection, which connection extends around the storage housing on an outer peripheral side.

* * * * *